US010116845B2

(12) United States Patent
Hiramatsu

(10) Patent No.: US 10,116,845 B2
(45) Date of Patent: Oct. 30, 2018

(54) IMAGING DEVICE

(71) Applicant: Takahiro Hiramatsu, Kanagawa (JP)

(72) Inventor: Takahiro Hiramatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/133,346

(22) Filed: Apr. 20, 2016

(65) Prior Publication Data
US 2016/0234412 A1 Aug. 11, 2016

Related U.S. Application Data

(63) Continuation of application No. PCT/JP2014/078321, filed on Oct. 24, 2014.

(30) Foreign Application Priority Data

Nov. 6, 2013 (JP) .................................. 2013-230385

(51) Int. Cl.
*H04N 7/14* (2006.01)
*H04N 5/225* (2006.01)
(Continued)

(52) U.S. Cl.
CPC ............ *H04N 5/2254* (2013.01); *G02B 7/02* (2013.01); *G03B 11/04* (2013.01); *G03B 11/045* (2013.01);
(Continued)

(58) Field of Classification Search
CPC .. H04N 5/2254; H04N 5/2252; H04N 5/2253; H04N 5/2257; H04N 7/15; G02B 7/02
(Continued)

(56) References Cited

U.S. PATENT DOCUMENTS 6,411,332 B1 6/2002 Whitby et al.
6,873,356 B1 3/2005 Kanbe et al.
(Continued)

FOREIGN PATENT DOCUMENTS

CN 103380398 A 10/2013
GB 2471145 A 12/2010
(Continued)

OTHER PUBLICATIONS

Extended European Search Report dated Oct. 13, 2016 in Patent Application No. 14860630.4.
(Continued)

*Primary Examiner* — Xi Wang
(74) *Attorney, Agent, or Firm* — Oblon, McClelland, Maier & Neustadt, L.L.P.

(57) ABSTRACT

An imaging device includes an imaging unit having an imaging part, and a holder to hold the imaging part at one end; a housing including a recess part in a first surface to house the imaging unit; and a hinge device having a hinge member housed in the recess part pivotally coupled to the housing around an axle extending in parallel with the first surface. The imaging unit pivots around the axle via the hinge device between a housing position and a projecting position of the imaging unit. The imaging part includes a rectangular imaging element, a lens introducing external light into the imaging element, and a lens hood at an outer periphery of the lens. The lens hood projects from the lens surface by a distance allowing the imaging part to introduce necessary light from the lens into the imaging element and block unnecessary light.

13 Claims, 6 Drawing Sheets

(51) Int. Cl.
*G03B 11/04* (2006.01)
*G03B 17/02* (2006.01)
*G02B 7/02* (2006.01)
*H04N 7/15* (2006.01)

(52) U.S. Cl.
CPC ........... *G03B 17/02* (2013.01); *H04N 5/2252* (2013.01); *H04N 5/2253* (2013.01); *H04N 7/142* (2013.01); *H04N 7/15* (2013.01)

(58) Field of Classification Search
USPC .......... 348/14.08, 373–376; 361/600, 679.01
See application file for complete search history.

(56) References Cited

U.S. PATENT DOCUMENTS

| | | | |
|---|---|---|---|
| 8,570,434 | B2 | 10/2013 | Odanaka et al. |
| 9,063,394 | B2 | 6/2015 | Umehara |
| 9,167,200 | B2 | 10/2015 | Odanaka et al. |
| 2005/0117900 | A1* | 6/2005 | Ohmori ................ G03B 11/041 396/448 |
| 2009/0147127 | A1* | 6/2009 | Ogawa ................... G03B 17/02 348/374 |
| 2010/0073771 | A1* | 3/2010 | Kitakata ................ G03B 11/04 359/611 |
| 2010/0084529 | A1* | 4/2010 | Depay .................... F16M 11/10 248/229.22 |
| 2012/0056973 | A1 | 3/2012 | Yano |
| 2012/0120262 | A1* | 5/2012 | Gutierrez ............. H04N 5/2254 348/207.99 |
| 2012/0293692 | A1 | 11/2012 | Namie et al. |
| 2014/0044257 | A1* | 2/2014 | Shida .................. H05K 7/20336 379/432 |
| 2014/0049615 | A1* | 2/2014 | Uwagawa ............ H04N 5/2252 348/47 |
| 2015/0077629 | A1* | 3/2015 | Jeong .................. H04N 5/2254 348/374 |

FOREIGN PATENT DOCUMENTS

| | | |
|---|---|---|
| JP | H10-010607 | 1/1998 |
| JP | H10-023321 | 1/1998 |
| JP | 2001-069391 | 3/2001 |
| JP | 2012-054814 | 3/2012 |
| JP | 2012-151521 | 8/2012 |
| JP | 2013-242364 | 12/2013 |
| WO | WO 2012/147993 A1 | 11/2012 |
| WO | 2013/172167 A1 | 11/2013 |

OTHER PUBLICATIONS

International Search Report dated Jan. 27, 2015, in PCT/JP2014/078321 filed on Oct. 24, 2014 ( with English Translation).
Written Opinion dated Jan. 27, 2015, in PCT/JP2014/078321 filed on Oct. 24, 2014.
Chinese Office Action dated Oct. 31, 2017 for Chinese Patent Application No. 201480060137.4 with English translation.

* cited by examiner

IMAGING DEVICE

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2014/078321 filed on Oct. 24, 2014, which is based upon and claims the benefit of priority of the prior Japanese Patent Application No. 2013-230385, filed on Nov. 6, 2013, with the Japanese Patent Office, the entire contents of which are hereby incorporated by reference.

BACKGROUND OF THE INVENTION

1. Field of the Invention

An aspect in the following disclosure relates to an imaging device provided with a lens protecting mechanism.

2. Description of the Related Art

Conference systems capable of being used to conduct a remote conference between remote places via communications networks such as the Internet have become popular. Such conference systems utilize a technology known in the art to conduct a remote conference; that is, a communications apparatus acquires images and speech of conference participants in one conference room, converts the acquired images and speech into digital data, and transmits the converted digital data to a counterpart communications apparatus. The counterpart communications apparatus subsequently displays the acquired images and outputs the speech in a counterpart conference room so that conference participants in two remotely separate conference rooms can conduct a remote conference in a state close to an actual conference.

Patent Document 1, for example, discloses a communications apparatus having excellent portability as an example of the above technology. The disclosed communications apparatus has a uniaxial hinge configured to pivotally connect an image input unit including a digital camera and a housing.

RELATED-ART DOCUMENT

Patent Document

[Patent Document 1] Japanese Unexamined Patent Application Publication No. 2012-151521

The technology disclosed in Patent Document 1 may improve portability and operability of the communications apparatus because the disclosed technology enables the communications apparatus to house a camera arm to protect a camera lens, thereby no longer requiring a lens cap attached to the communications apparatus so as to eliminate inefficient operations of attaching and detaching the lens whenever the communications apparatus is used and unused. The technology disclosed in Patent Document 1 may further provide the communications apparatus with a protruding object and a lens filter to prevent the lens from contacting the housing when housing the camera arm.

SUMMARY OF THE INVENTION

It is one of objects of the present invention to solve such problems. In other words, it is an object of the present invention to provide a communications apparatus capable of protecting the lens without a complicated mechanism and avoid inefficient operations as well as preventing the quality of the acquired images from degrading due to undesired light.

According to an aspect in the disclosure, there is provided an imaging device that includes an imaging unit having an imaging part configured to image a subject, and a holder configured to hold the imaging part at one end thereof; a housing including a recess part formed in a first surface thereof, and configured to house the imaging unit; and a hinge device having a hinge member housed in the recess part pivotally coupled to the housing around an axle extending approximately in parallel with the first surface inside the recess part of the housing. The imaging unit pivots around the axle via the hinge device between a housing position at which the imaging unit is housed inside the recess part of the housing and a projecting position at which the imaging unit is projected from the recess part of the housing. The imaging part includes an imaging element having an approximately rectangular shape, a lens configured to introduce external light into the imaging element, and a lens hood mounted at an outer periphery of the lens. The lens hood projects from a surface of the lens by a distance to allow the imaging part to introduce light necessary for imaging a subject from the lens into the imaging element and to block unnecessary light introduced from the lens into the imaging element.

BRIEF DESCRIPTION OF THE DRAWINGS

Other objects and further features of embodiments will be apparent from the following detailed description when read in conjunction with the accompanying drawings, in which.

DETAILED DESCRIPTION OF THE PREFERRED EMBODIMENTS

Figure 1:
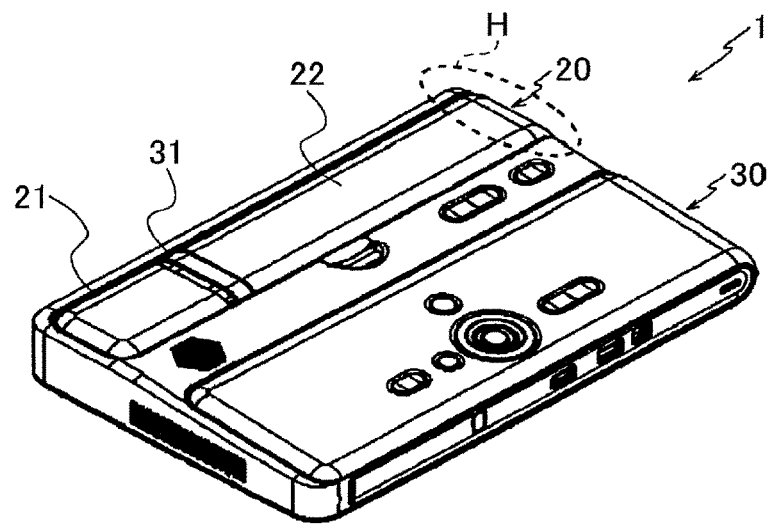
FIG. 1 is a schematic perspective view illustrating an imaging apparatus according to an embodiment.

In the following, an imaging device according to an embodiment of the present invention will be described with reference to the accompanying drawings; however, the present invention is not limited to the specifically disclosed embodiment within the gist of the present invention. Note that the same or similar components are provided with the same reference numbers in the drawings to omit or partially omit duplicated illustration.

Figure 2:
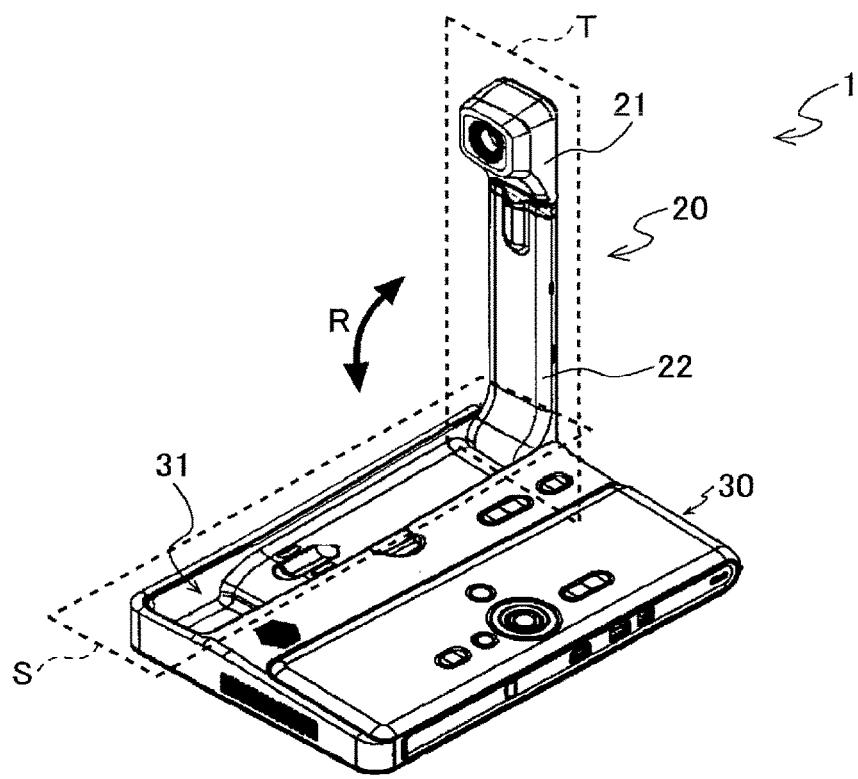
FIG. 2 is a schematic perspective view illustrating an imaging apparatus according to the embodiment.

The following embodiment illustrates a TV conference apparatus illustrated in FIGS. 1 and 2 as an example of an apparatus provided with an imaging device according to an embodiment. However, the invention is not limited to the TV conference. The invention may include a communications apparatus such as a camcorder, a digital still camera, and a TV conference apparatus, or an information processing apparatus such as a smartphone. The invention applied may further include an imaging device, a communications apparatus, and an information processing apparatus of another type that incorporates an imaging part in a housing of a main body.

The following illustrates a schematic configuration of a TV conference apparatus 1 as an apparatus having an imaging device according to an embodiment with reference to FIGS. 1 and 2. FIG. 1 is an external view illustrating the TV conference apparatus 1 that is unused. The TV conference apparatus 1 that is unused has a substantially thin and oblong rectangular parallelepiped outer shape or a substantially plate-like outer shape. The TV conference apparatus 1 may be placed on a table or a desk parallel to a horizontal plane.

The TV conference apparatus 1 includes a camera part 20 serving as an imaging unit composed of a camera head 21 and a camera arm 22, and a housing 30. The camera head 21 serves as an imaging part configured to image a subject, and the camera arm 22 serves as a holder configured to hold the camera head 21 at one end. The housing 30 has a recess part 31 as an upper surface of one side, which is configured to house the camera part 20. The camera part 20 that is not being used is housed in the recess part 31, as illustrated in FIG. 1. This facilitates users' carrying the TV conference apparatus 1, thereby improving its portability. The camera part 20 corresponds to an imaging device.

Next, an illustration is given of the TV conference apparatus 1 that is used with additional reference to FIG. 2. In this example, the TV conference apparatus 1 is provided with a hinge device H. The hinge device H includes a hinge member connected to the housing 30 inside the recess part 31 relatively and pivotally around an axle extending in substantially parallel with the upper surface inside the recess part 31 of the TV conference apparatus 1.

When the camera part 20 is used, the camera part 20 pivotally moves via a pivoting shaft of the hinge device H in a pivoting direction R to a position perpendicular to the housing 30.

The following specifically describes a pivoting mechanism of the camera part 20. The camera part 20 is configured to pivotally moves between a housing position S and projecting position T. The housing position S is a position around the axle at which the camera part 20 is housed via the hinge device H inside the recess part 31, and the projecting position T is a position at which the camera part 20 projects from the recess part 31.

The TV conference apparatus 1 according to the embodiment when it is used is configured to pivotally move the camera part 20 from the housing position S to the projecting position T, thereby matching the user's eye and a height of the camera head 21. A position of the images projected from the camera part 20 onto a predetermined projecting part thus matches the user's eye to facilitate the user's observation of the projected images.

The camera part 20 that is in use is vertically projected from the housing 30, which is not easy for the user to carry. However, the TV conference apparatus 1 according to the embodiment is configured to house the camera part 20 inside the recess part 31 to enable the user to easily carry the TV conference apparatus 1, thereby improving the portability of the TV conference apparatus 1.

The structural features of the TV conference apparatus 1 further include a lens hood configured to protect a lens part of the camera part 20 from external impacts and dirt when the camera part 20 is housed in the housing 30, and prevent the damage to the lens part caused by contact between the housed lens part and the surface of the housing 30.

Note that a typical digital single-lens reflex camera or a camcorder has a lens hood simply attached to the camera lens, and the lens hood of this configuration does not serve as a protector to prevent the camera lens from being damaged when the camera is housed. The digital single-lens reflex camera or the camcorder uses a lens cover to simply protect a lens surface from scratching or dirt. That is, the digital single-lens reflex camera or the camcorder needs to have a separate lens cover.

The lens contacts the housing 30 without the lens hood when the camera part 20 is housed in the recess part 31. For example, when a user replaces the camera arm 22 strongly, the lens may strongly contact the housing 30. This may damage the lens due to impact.

On the other hand, the lens may be protected by attaching a protruding object around the lens. However, the protruding object may have a shape that interferes with rays of light incident on the lens, generating so-called vignetting that is physically introducing a shadow in an image taken. Thus, simply providing a protruding object for protecting the lens may fail to improve the quality of the image.

In the present embodiment, there may be employed a later-described lens hood having a specific feature in addition to the above-described pivoting mechanism of the camera arm 22. Thus, in the embodiment, there may be the features capable of protecting the lens without a complicated mechanism and avoiding inefficient operations as well as preventing the quality of the acquired images from degrading due to undesired light. Note that in the TV conference apparatus 1 according to the embodiment, lifting the camera arm when using the TV conference apparatus 1 achieves an operation of detaching a lens cap in the typical camera or the like. That is, the TV conference apparatus 1 according to the embodiment provides an effect of omitting the operation of detaching the lens cap.

The following describes a schematic configuration of the camera head 21 provided with the AD server apparatus 11 of the present embodiment with reference to FIGS. 3 to 9. The camera head 21 of the embodiment includes an imaging element 17 (see FIG. 10) having a substantially rectangular shape with an aspect ratio of 16:9, a lens 12 introducing external light into the imaging element 17, and a lens hood 11 having a substantially rectangular shape disposed on an outer periphery of the lens 12. The lens hood 11 having the substantially rectangular shape may have the same height in a horizontal direction since the shape of the lens hood 11 is roughly similar to the shape of the imaging element 17. That is, the lens hood has approximately the same height in vertical and horizontal directions, having taken account of the light incident on the imaging element 17. This facilitates forming the lens hood 11, and further shaping the recess part 31 into a planer shape for placing the camera part 20 into the recess part 31 at the housing position S. Note that the recess part 31 may be shaped to match the shape of the lens hood 11; however, it is not preferable to shape the recess part 31 into a complex form.

Figure 3:
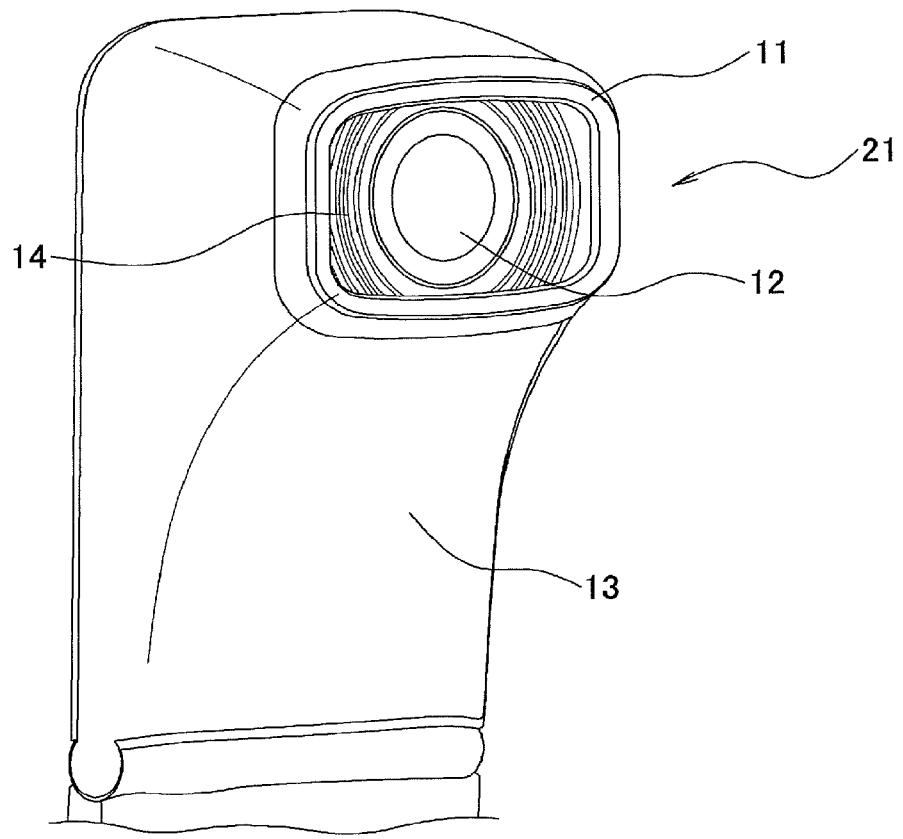
FIG. 3 is a schematic perspective view illustrating an imaging part according to the embodiment.

FIG. 3 is a perspective view illustrating an example of an appearance of the camera head 21. The lens hood 11 covers an outer circumferential edge of the lens part at an end of a camera head housing 13.

The lens hood 11 includes a gradient part 14 inclined downward from an outer peripheral end on a subject side (outside) of the lens hood 11 to an opening peripheral end on the imaging element side of the lens hood 11. The lens hood 11 includes a stepwise gradient part 14, for example (see FIGS. 3 to 6). This may reduce the proportion of reflection light incident on the lens 12 inside the lens hood 11.

Note that the lens hood 11 may preferably be painted black to further reduce the reflection light.

Figure 4:
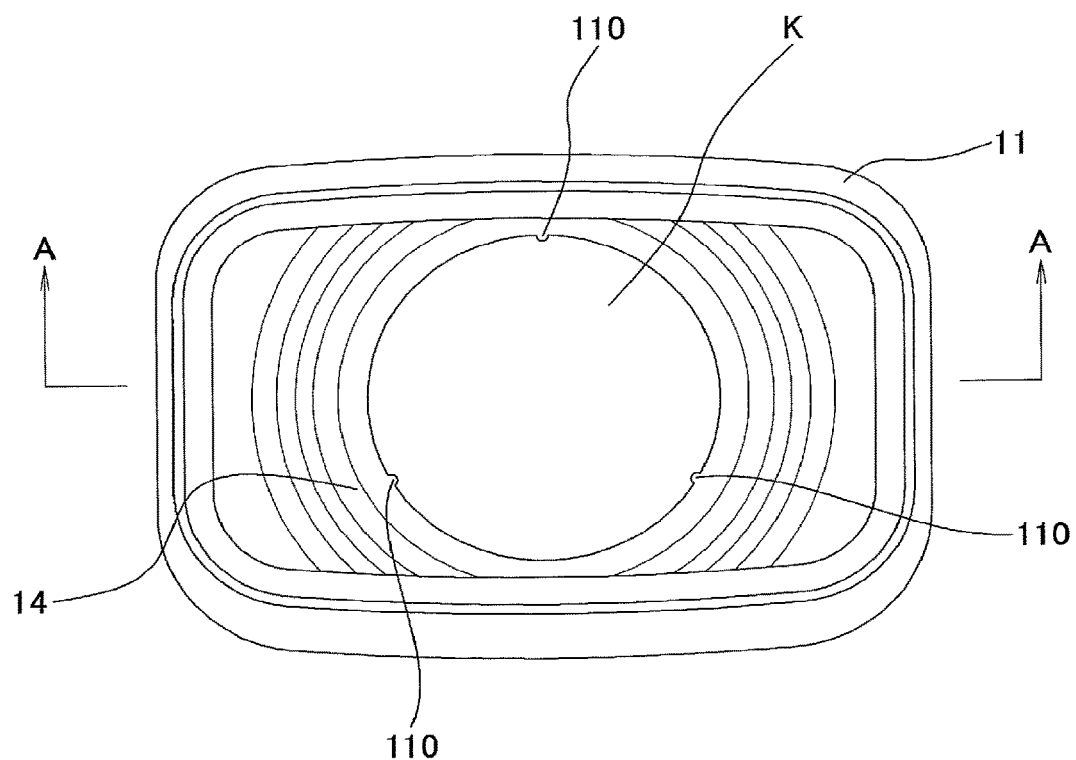
FIG. 4 is a front view illustrating a lens hood according to the embodiment.
Figure 5:
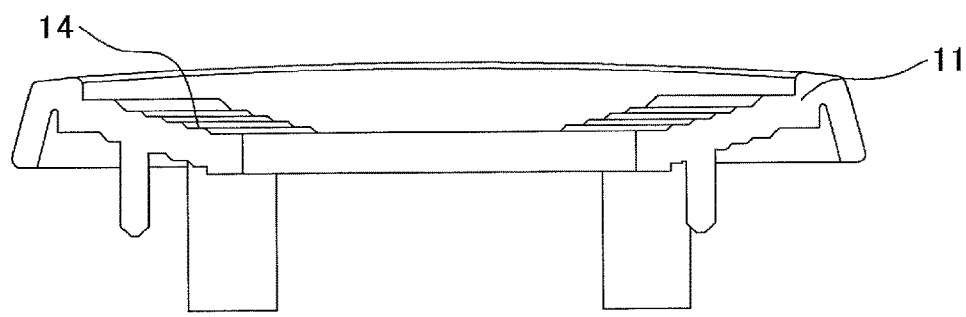
FIG. 5 is a cross-sectional view illustrating the lens hood according to the embodiment.

As illustrated in FIG. 4, the lens hood 11 further includes three protruding objects 110 mutually arranged at equal intervals on an outer periphery of an opening part K of the lens hood 11, which is fitted with the lens 12 to expose a surface of the lens 12 from the opening part K.

Note that when the lens hood 11 is not provided with the protruding objects 110, the lens 12 may be deflected toward the center of the lens hood 11, which may shield the light incident on the imaging element 17. Further, this configuration of the lens hood 11 and the lens 12 without having the protruding objects 110 in between may allow a gap between the lens hood 11 and the lens 12 to visually stand out conspicuously. Thus, arranging at least three protruding objects 110 mutually at equal internals on the outer periphery of the opening part K of the lens hood 11 may position the lens 12 at the center of the lens hood 11 to sufficiently introduce the incident light into the imaging element 17 as well as making the gap between the lens hood 11 and the lens 12 to visually less stand out.

Figure 6:
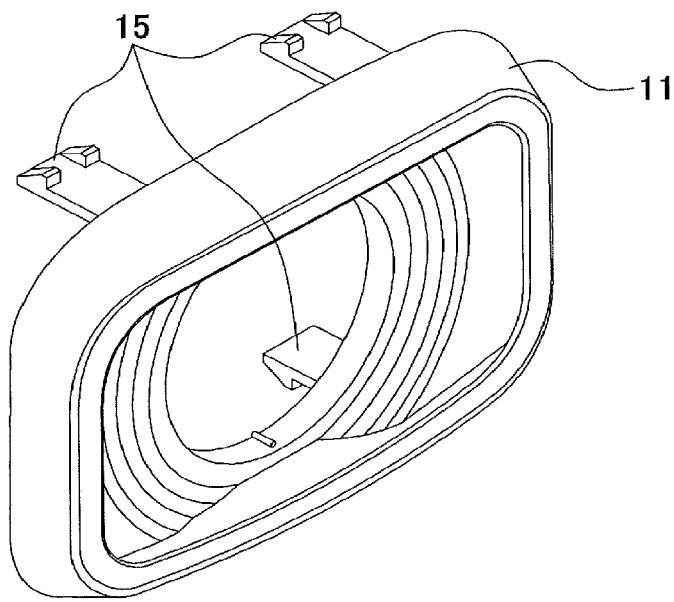
FIG. 6 is a perspective view illustrating the lens hood according to the embodiment.
Figure 7:
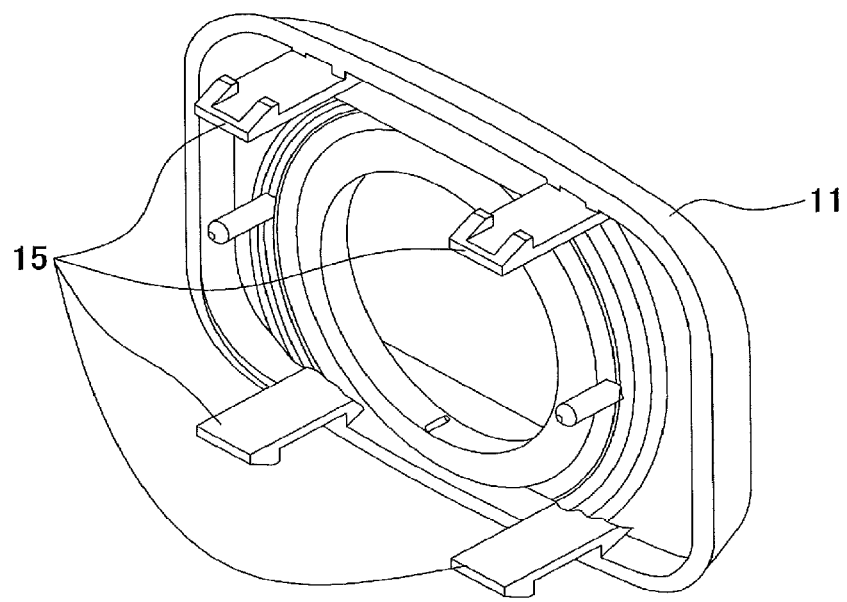
FIG. 7 is a perspective view illustrating the lens hood according to the embodiment.
Figure 8:
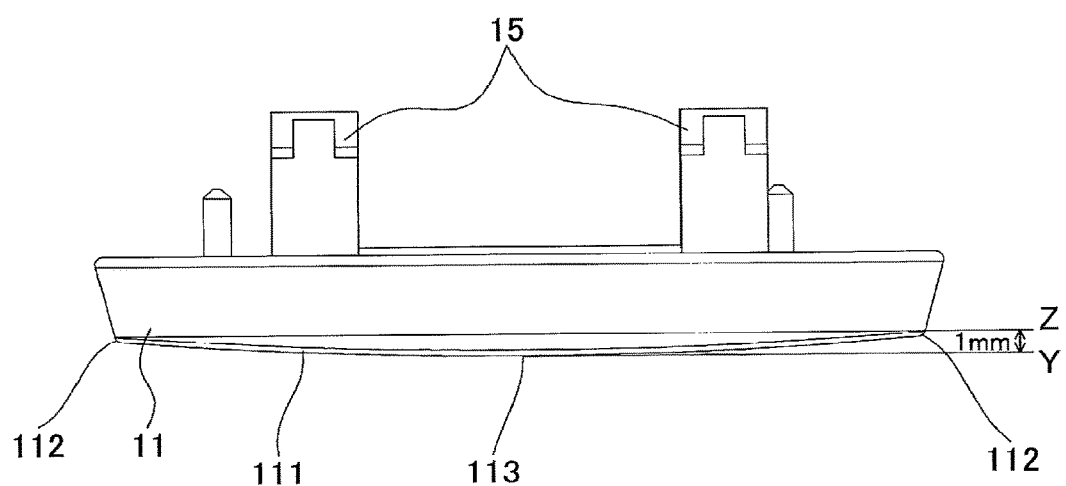
FIG. 8 is a top view illustrating the lens hood according to the embodiment.
Figure 9:
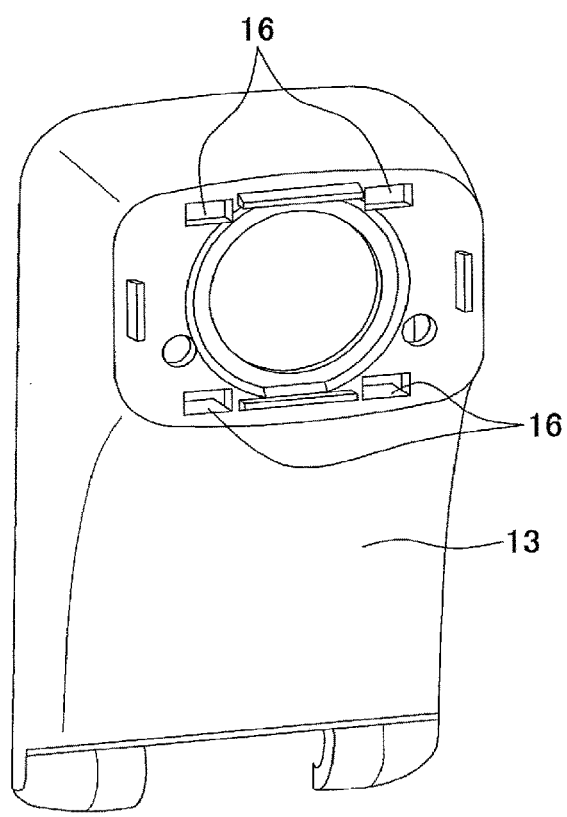
FIG. 9 is a perspective view illustrating a housing of the imaging part according to the embodiment.

As illustrated in FIGS. 6, 7, and 8, four claw parts 15 serving as attaching units are mounted on a rear surface of the lens hood 11; two of the claw parts 15 being mounted at an upper part of the rear face and two of the image forming apparatus 13 being mounted at a lower part of the rear surface to face the claw parts 15 at the upper part. The claw parts 15 each include claws directed outward, and are configured to attach the lens hood 11 to the image forming apparatus 13. The lens hood 11 is attached to the image forming apparatus 13 by fitting the claw parts 15 into counterpart claw receivers 16 formed in the image forming apparatus 13 illustrated in FIG. 9.

Alternatively, an elastic member such as rubber or sponge may be included inside the lens hood 11 instead to serve as the above-described locators and filler for filling the gap between the lens hood 11 and the lens 12.

Further, the lens hood 11 may be formed of a resilient material such as a cushion material (buffer material). Further, a part of the recess part 31 of the housing 30 that faces the camera head 21 housed in the recess part 31 at the housing position S may be formed of a resilient material such as a cushion material. The application of the above-described configuration may improve an impact absorption effect of the camera head 21 or the lens 12.

Further, a middle part 113 of the lens hood 11 has an end face 111 projected toward a subject side of the lens hood 11 with respect to two opposing ends sandwiching the middle part 113 as illustrated in FIG. 8. For example, the middle part 113 of the end face 111 in a longitudinal direction of the lens hood 11 forms a gradual projection with respect to left and right ends of the end face 111 of the lens hood 11. Note that the end face 111 indicates a part of an end face on one side in an approximately rectangular shape of the end face 111.

More specifically, the middle part 113 may be projected from the opposing ends 112 such that a difference in height between a tangent Y to the middle part 113 and a line segment Z connecting between the opposing ends 112 is approximately 1.0 mm. This structural configuration may restrict a position of the lens hood 11 coming in contact with the recess part 31 to the middle part 113 when the camera part 20 is housed in the recess part 31 of the housing 30. Note that the reason for determining the difference in height to be approximately 1.0 mm is, as illustrated earlier, to form the recess part 31 having a shallow depth. This is because forming the recess part 31 having a greater depth leads to an undesired increase in the thickness of the housing 30. Note that a projecting part with respect to the opposing ends is not limited to the middle part 113, and any part of the end part may be projected with respect to other parts of the end part.

Alternatively, the middle parts 113 of both an upper end face and a lower end face in the longitudinal direction of the lens hood 11 may be projected with respect to the opposing ends 112.

If the end face of the lens hood 11 is flat, the overall part of the lens hood 11 may acquire fine scratches due to the contact between the lens hood 11 and the housing 30 when the lens hood 11 is housed in the housing 30, thereby degrading the appearance of the lens hood 11. By contrast, the structural configuration of the lens hood 11 restricts a position to acquire such fine scratches due to the contact between the lens hood 11 and the housing 30 to a specific position of the lens hood 11, thereby allowing the scratch to be unnoticeable to improve a design property.

Note that it is not necessary to form a part of the above-described recess part 31 facing the camera head 21 with a resilient material.

Figure 10:
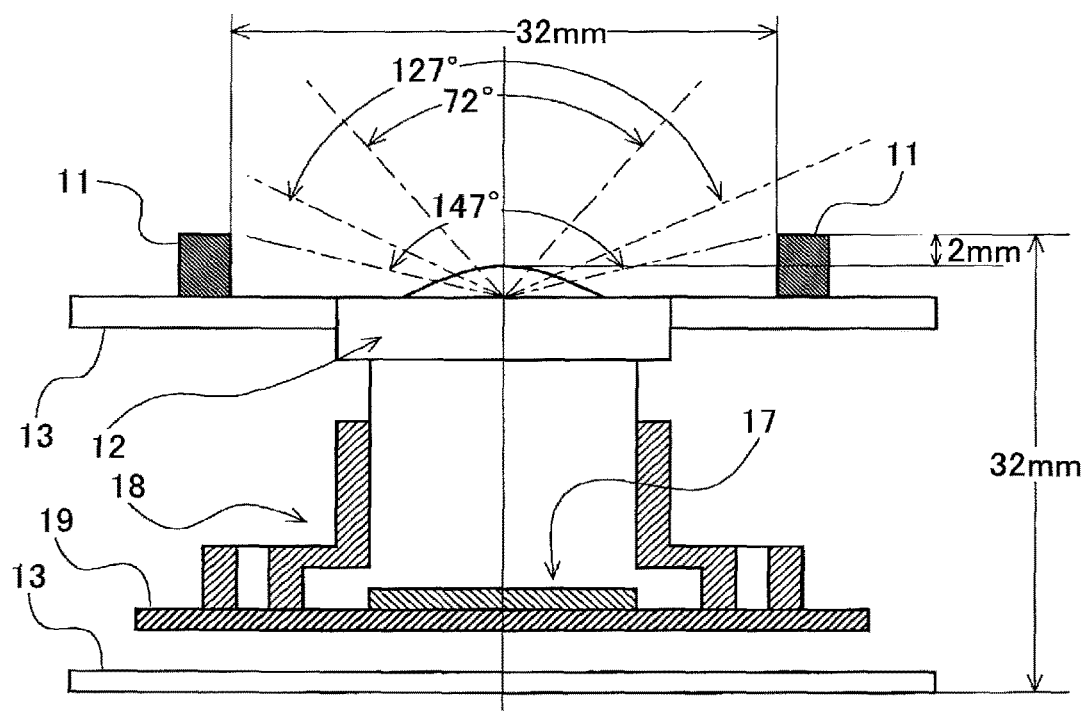
FIG. 10 is a schematic diagram illustrating a design of the lens hood according to the embodiment.
Figure 11:
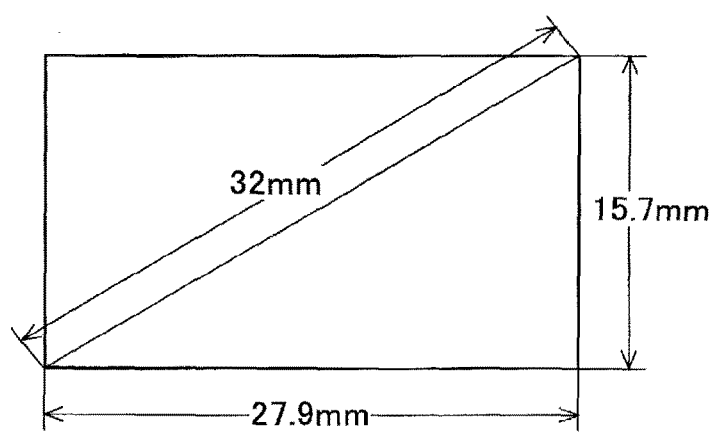
FIG. 11 is a schematic diagram illustrating the design of the lens hood according to the embodiment.

The following illustrates a featured structure of the lens hood 11 according to the embodiment with reference to FIGS. 10 and 11. The TV conference apparatus 1 according to the embodiment preferably employ a wide angle camera to capture all the conference participants in an imaging visual field. The apparatus employing a wide angle camera generally needs to introduce rays of light into the imaging element 17 in a wider range of angles, which leads to a total length of the lens hood to be short; that is, a distance from the lens to the lens hood 11 is short.

Note that the lens hood is configured to block strong rays of light introduced from outside the imaging view angle, and hence prevent an adverse phenomenon such as lens flare. The lens hood may provide higher effect on preventing the adverse phenomenon as the lens hood blocks unnecessary light in a wider range. On the other hand, the lens hood may also need to introduce an amount of light necessary for imaging the subject into the imaging element 17 through the lens.

To reduce contradiction between the two opposing factors, the lens hood 11 may have a projection with a distance from the surface of the lens 12 to acquire light necessary for imaging the subject by the camera head 21 to be introduced from the lens 12 into the imaging element 17 and to block unnecessary light to be introduced from the lens 12 into the imaging element 17.

Specifically, the lens hood 11 of the embodiment is designed as follows. Dimensions of the lens hood 11 are calculated based on an angle incident on the lens and an effective area of the imaging element 17. The imaging element 17 of the camera head 21 has a landscape-oriented rectangular shape having an aspect ratio of 16:9. Since the imaging element 17 of the embodiment has a landscape-oriented rectangular shape, the imaging element 17 has a rectangular shape having a short length in a vertical direction and a greater width in a horizontal direction. Further, the imaging element 17 of the camera head 21 has a maximum angle of view in a diagonal direction.

The TV conference apparatus 1 is configured to protect the lens 12 by the lens hood 11, where the lens hood 11 is desired to project from a top of the lens by approximately 1.0 mm. In order to allow a tolerance of ±0.5 mm and an individual difference in a distance of approximately 0.5 mm from the lens 12 to the imaging element 17 for adjusting a focal distance at assembling, the TV conference apparatus 1 according to the embodiment may preferably have a structural configuration in which a top of the lens hood 11 is at a position 2.0 mm higher than the top of the lens 12. Specifically, a projecting distance R from a top of the surface of the lens 12 of the lens hood 11 is preferably 1.0 mm≤R≤2.0 mm.

Note that the top of the lens hood 11 may be at a higher position. However, this increases a thickness of the camera head housing 13 due to the configuration of the camera head 21 allowing to house the camera part 20 when the TV conference apparatus 1 is unused. The thickness of the camera head housing 13 to be set may preferably be less than 40 mm.

As illustrated in FIGS. 10 and 11, the TV conference apparatus 1 of the embodiment has the thickness of the camera head housing 13 excluding the lens hood 11 being 30 mm. To further consider the thickness of a receiver side of the housing 30 to receive the camera part 20, the upper limit of the height of the lens hood 11 may preferably be approximately 5.0 mm.

In order to increase the thickness of the lens hood 11 without preventing the light being introduced into the imaging element 17, a diameter of the lens hood 11 needs to be increased. In view of the portability, the TV conference apparatus 1 of the embodiment may desirably be compact. Thus, a preferable height of the lens hood 11 may be, for example, approximately 2.0 mm.

Next, a description is given, with reference to FIG. 10, of an incident path of light incident on the lens 12. The maximum incident angle is obtained in the diagonal direction, and is preferably 147°, the incident angle in the horizontal direction is preferably 127°, and the incident angle in the vertical direction is preferably 72°. Light is incident on the imaging element 17 within a diameter range of 30.32 mm at a position 2.0 mm higher than the top of the above-described lens 12. The lens hood 11 preferably has dimensions to introduce incident light into the imaging element 17 without vignetting. The camera head 21 may preferably have a diagonal length of the lens hood 11 to be 32 mm.

Note that a lens holder 18 and a sensor substrate 19 are further mounted within the camera head housing 13.

Note that the lens hood 11 may have a round shape having a diameter of 32 mm. Note that in this example of having a round diameter, the angle of view in the horizontal direction and the angle of view in the vertical direction are smaller than the angle of view in the diagonal direction, and effective incident light is incident within a corresponding diameter range of 19.4 mm and 7.90 mm. Thus, the lens hood 11 having a diameter of 32 mm may lower a proportion of unnecessary light to be blocked by the lens hood 11.

The TV conference apparatus 1 of the embodiment may preferably employ a square lens hood. The square lend hood may have smaller dimensions in the horizontal and the vertical directions compared to the round lens hood. The TV conference apparatus 1 of the embodiment having the square lend hood may improve light shielding performance. Further, the TV conference apparatus 1 of the embodiment having the square lend hood may have a compact camera head because the dimensions of the lens hood in the vertical direction are reduced.

Next, an illustration is given of designing the dimensions of the lens hood 11 of the embodiment with reference to FIG. 11. As described above, the imaging element 17 of the camera head 21 has a landscape-oriented rectangular shape having an aspect ratio of 16:9. The lens hood 11 thus has a rectangular shape having a diagonal length of 32 mm and an aspect ratio of 16:9. This indicates that the lens hood 11 may preferably have a lateral length of 27.9 mm, and a vertical length of 15.7 mm, for example.

According to an aspect in the disclosure, it is possible to protect a lens without a complicated mechanism and avoid inefficient operations as well as preventing the quality of the acquired images from degrading due to undesired light.

Further, the present invention is not limited to these embodiments and examples described above, but various variations and modifications may be made without departing from the scope of the present invention.

What is claimed is:

1. An imaging device comprising:
   an imaging unit having an imager configured to image a subject, and a holder configured to hold the imager at one end thereof;
   a housing including a recess formed in a first surface thereof, and configured to house the imaging unit, the housing being a housing for a video conferencing device; and
   a hinge having a hinge member housed in the recess pivotally coupled to the housing around an axle extending approximately in parallel with the first surface inside the recess of the housing, wherein
   the imaging unit pivots around the axle via the hinge between a housing position at which the imaging unit is housed inside the recess of the housing and a projecting position at which the imaging unit is projected from the recess of the housing,
   wherein:
   the imager includes an imaging element having a rectangular shape with a 16:9 aspect ratio, a lens configured to introduce external light into the imaging element, and a lens hood mounted at an outer periphery of the lens, the imaging element disposed inside of the housing,
   the lens hood projects from a surface of the lens by a distance to allow the imager to introduce light for imaging a subject from the lens into the imaging element and to block unnecessary light introduced from the lens into the imaging element,
   a shape of the lens hood is substantially rectangular, and has an aspect ratio substantially the same as the aspect ratio of the imaging element, and
   the substantially rectangular shape of the lens hood has substantially the same shape as the rectangular shape of the imaging element in both a horizontal and a vertical dimension.

2. The imaging device according to claim 1, wherein:
   when R represents the distance by which the lens hood projects from the surface of the lens, R is 1.0 mm≤R≤2.0 mm.

3. The imaging device according to claim 1, wherein:
   the lens hood further includes a gradient part, and
   the gradient part is inclined from a periphery of a subject side end face of the lens hood to a periphery of an opening of the lens hood toward an imaging element side.

4. The imaging device according to claim 1, wherein:
a subject side end face of the lens hood includes a middle part and end parts that sandwich the middle part, and
at least the middle part projects toward a subject side with respect to the end parts that sandwich the middle part.

5. The imaging device according to claim 1, wherein:
the lens hood includes a resilient material.

6. The imaging device according to claim 1, wherein:
the recess includes a region facing the imager at a housing position at which the imaging unit is housed, and
at least the region facing the imager includes a resilient material.

7. The imaging device according to claim 1, wherein the lens hood comprises:
a substantially rectangular section at an inner portion of the lens hood which surrounds a lens opening of the lens hood.

8. The imaging device according to claim 7, wherein:
the substantially rectangular section at the inner portion of the lens hood includes a gradient part.

9. The imaging device according to claim 8, wherein:
the gradient part includes steps which are at an outer region.

10. The imaging device according to claim 8, wherein:
the gradient part includes an outer region that is more outward from the lens than an inner region.

11. The imaging device according to claim 7, wherein the substantially rectangular region includes protrusions to mount the lens hood to the imager.

12. The imaging device according to claim 1, wherein:
the lens hood includes an opening to expose the surface of the lens when the lens is fit into the lens hood,
the lens hood includes at least three protrusions disposed at an outer periphery of the opening, the protrusions protruding towards a center of the lens.

13. The imaging device according to claim 12, wherein the at least three protrusions are disposed at equal intervals at the outer periphery of the opening.

* * * * *